United States Patent
Guo et al.

(10) Patent No.: US 11,657,280 B1
(45) Date of Patent: May 23, 2023

(54) REINFORCEMENT LEARNING TECHNIQUES FOR NETWORK-BASED TRANSFER LEARNING

(71) Applicant: PlusAI, Inc., Santa Clara, CA (US)

(72) Inventors: Yue Guo, Pittsburgh, PA (US); I-Hsuan Yang, Mountain View, CA (US); Yu Wang, San Jose, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 17/978,491

(22) Filed: Nov. 1, 2022

(51) Int. Cl.
*G06N 3/08* (2023.01)
(52) U.S. Cl.
CPC ..................... *G06N 3/08* (2013.01)
(58) Field of Classification Search
CPC ........................................................ G06N 3/08
See application file for complete search history.

(56) References Cited

U.S. PATENT DOCUMENTS

2022/0108171 A1* 4/2022 Puigcerver I Perez ...................... G06N 3/045
2022/0327468 A1* 10/2022 Donnels ............... G06Q 10/087

FOREIGN PATENT DOCUMENTS

WO    WO-2020214580 A1 * 10/2020    ........... A61B 5/4325

OTHER PUBLICATIONS

Kono et al. "transfer Learning Method Using Ontology for Heterogenous Multi-agent Reinforcement Learning", IJACSA, 2014, pp. 156-164.*
Shi et al. "Lateral Transfer Learning for Multiagent Reinforcement Learning", IEEE TC, 2021, pp. 13.*
Hua et al. "Learning for a Robot: Deep Reinforcement Learning, Imitation Learning, Transfer Learning", sensors, 2021, pp. 21.*
Hou et al. "Methods and Apparatus to Automatically Updateartificial Intelligence Models for Autonomousfactories", Nov. 8, 2022, KR, pp. 57 (English translation of KR 20220149418A).*

* cited by examiner

*Primary Examiner* — Li Wu Chang
(74) *Attorney, Agent, or Firm* — Kilpatrick Townsend & Stockton LLP

(57) ABSTRACT

Embodiments provide reinforcement learning (RL) techniques for transferring machine learning obtained in one domain to another. A neural network (NN) of a source domain may be trained using training data associated with that domain. In some cases, the training data is inaccessible to a target domain for which a similar NN is desired. A number of target NNs may be initialized with a portion of the parameters transferred from the source NN. A computing agent may utilize RL techniques to train the target NNs using training data of the target domain. The target NN with the most beneficial subset of transferred parameters may be selected. By using the RL techniques to identify the most advantageous combination of transferred parameters, a similarly accurate NN may be provided in the target domain at a fraction of the otherwise needed time and without accessing the original training data.

19 Claims, 9 Drawing Sheets

US 11,657,280 B1

REINFORCEMENT LEARNING TECHNIQUES FOR NETWORK-BASED TRANSFER LEARNING

BACKGROUND

Various vehicles employ computing means to aid automated vehicle operation. Recently, in the automotive industry, much of the focus is on making a vehicle operate in an autonomous mode in a safe manner.

Many autonomous vehicle systems employ predictive models (e.g., neural networks) that, given various sensor input captured at the vehicle, predict a future driving situation (e.g., a lane change, a cut in, etc.). In response to the predicted situation, a corresponding action (e.g., reduce speed, change lanes, etc.) may be selected for the autonomous vehicle in question and actuators of the vehicle may be controlled to carry out the action. Training these, and other, predictive models can be time consuming and complicated and may require many instances of training data to produce an acceptably accurate predictive model. Data obtained in one domain may include features that may be less helpful, or completely unhelpful, in a different domain. Additionally, training data of one domain may be restricted from use in another domain.

Embodiments are directed to addressing these and other problems, individually and collectively.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Embodiments provide a computing device configured to identify an optimal combination of parameters of a source neural network (e.g., a neural network trained in a source domain using training data of that domain) to transfer to a neural network corresponding to a different domain. The disclosed techniques may utilize reinforcement learning techniques to train a variety of neural networks with different subsets of parameters transferred from the source neural network. Training data of the target domain may be utilized to finetune the transferred parameters as well as to identify the remaining parameters of the target neural network. In some embodiments, the transferred parameters may be frozen (e.g., made immutable) while the remaining parameters of the target neural network(s) are trained using subsets of the training data associated with the target domain.

In one general aspect, a method may include obtaining, by a computing device, a source neural network that is associated with a set of parameters that have been determined based at least in part on a machine-learning algorithm and source training data associated with a source domain. In some embodiments, the source training data may be inaccessible to the computing device (and/or a target domain for which a similar neural network is desired). The method may include initializing, by the computing device, a plurality of candidate target neural networks with a subset of parameters respectively transferred from a set of parameters associated with the source neural network. The method may include obtaining, by the computing device, target training data associated with a target domain. In some cases, the target domain (e.g., country B) may be different from the source domain (e.g., country A). The method may include training, by the computing device, the plurality of candidate target neural networks using corresponding subsets of the target training data associated with the target domain. In some embodiments, the plurality of candidate target neural networks may be trained utilizing a reinforcement learning algorithm. A target neural network may be selected by the computing device from the plurality of candidate target neural networks based on subsequent output provided by the plurality of candidate target neural networks. One or more operations may be performed by the computing device (or another computing device) based at least in part on the target neural network selected. By way of example, sensor data and/or images obtained in country B may be provided to a neural network trained using the techniques described herein to predict a future driving situation with which a predicted action for an autonomous vehicle may be identified. The neural network of country B may be trained using parameters of the neural network trained with data associated with country A, and training data obtained in country B, without requiring access to any training data previously obtained in country A.

In one general aspect, a computing device may include one or more processors and a memory storing instructions that, when executed by the one or more processors, cause the one or more processors to: obtain a source neural network that is associated with a set of parameters that have been determined based at least in part on a machine-learning algorithm and source training data associated with a source domain, the source training data being inaccessible to the computing device; initialize a plurality of candidate target neural networks with a subset of parameters respectively transferred from a set of parameters associated with the source neural network; obtain target training data associated with a target domain, the target domain being different from the source domain; train the plurality of candidate target neural networks using corresponding subsets of the target training data associated with the target domain, the plurality of candidate target neural networks being trained utilizing a reinforcement learning algorithm; select a target neural network from the plurality of candidate target neural networks based on subsequent output provided by the plurality of candidate target neural networks; and perform one or more operations based at least in part on the target neural network selected.

In one general aspect, a non-transitory computer-readable medium storing instructions that, when executed by one or more processors of a computing device, cause the computing device to obtain a source neural network that is associated with a set of parameters that have been determined based at least in part on a machine-learning algorithm and source training data associated with a source domain, the source training data being inaccessible to the computing device; initialize a plurality of candidate target neural networks with a subset of parameters respectively transferred from a set of parameters associated with the source neural network; obtain target training data associated with a target domain, the target domain being different from the source domain; train the plurality of candidate target neural networks using corresponding subsets of the target training data associated with the target domain, the plurality of candidate target neural networks being trained utilizing a reinforcement learning algorithm; select a target neural network from the plurality of candidate target neural networks based on subsequent output provided by the plurality of candidate target neural networks; and perform one or more operations based at least in part on the target neural network selected.

Other embodiments of this aspect include corresponding computer systems, apparatus, and computer programs recorded on one or more computer storage devices, each configured to perform the actions of the methods described herein.

Further details regarding embodiments of can be found in the Detailed Description and the Figures.

DETAILED DESCRIPTION

Figure 1:
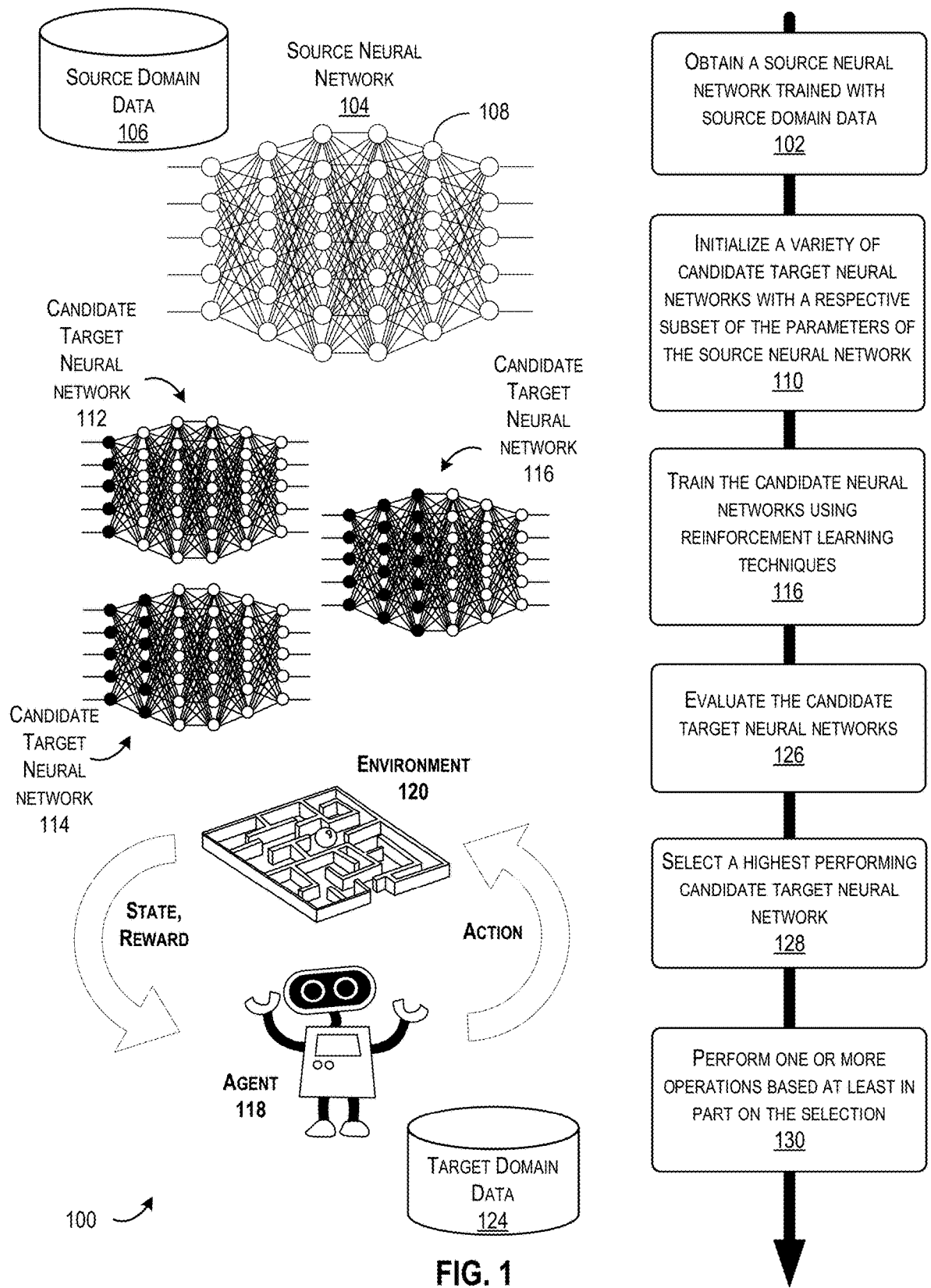
FIG. 1 illustrates an example flow depicting the utilization of reinforcement learning for identifying an optimal combination of parameters to transfer learning from one domain to another, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments provide techniques for utilizing reinforcement learning to provide improvements to network-based deep transfer learning. In network-based deep transfer learning, one or more parameters of a neural network (hereinafter a "source neural network," or "source network" or "SNN," for brevity) that has been pre-trained using training data collected in a source domain, is reused in a target domain that is different from the source domain. It is often the case that transferring some portions of the source network may be beneficial, while transferring other portions may hamper the accuracy of the target network (e.g., a neural network associated with the target domain). Identifying which parameters of the source network are transferrable (e.g., provide benefits when transferred) can be time consuming and involve vast amounts of manual effort. Traditional transfer learning approaches to domain adaption and domain generation require a comparison, and thus access, to both the source and target domain data sets. These approaches may examine the domain differences between the two domain data sets or generalize from the source data set. This is a significant limitation in situations where access to the source data is restricted.

By way of example, prediction in self-driving is an important component in ensuring that an autonomous vehicle (AV) can anticipate intentions (e.g., future actions) of other surrounding vehicle(s). After receiving data (e.g., sensor data, images, etc.) from a perception device (e.g., input devices such as LIDAR, RADAR, a camera, etc.), the prediction module may feed the received data into a neural network to generate a label or trajectory that represents the intention of the surrounding vehicle(s). The neural network may be trained to identify objects from sensor data and/or images obtained from an autonomous vehicle using training data associated with one domain (e.g., "country A"). An accurate prediction result is fundamental for the AV to be able to make decisions or recommend actions.

One challenge for prediction in autonomous driving technologies is that many models (e.g., neural networks) are trained independently using domain-specific data sets. However, it can be time consuming and costly to train a neural network for each domain. In the ongoing example, the training data from one domain (e.g., "country A") that was used to train the neural network, may not be accessible or available to use in a target domain (e.g., "country B"). Additionally, each domain may have differences such as, but not limited to different traffic rules, driving culture, geographical distinctions, and the like. It may be the case that the training data set in a given domain (e.g., country B) is not extensive enough to provide sufficient training material to train a relatively accurate prediction model. Additionally, data collection (e.g., in country B) can be restricted due to law, expense, and human resources.

Generally, neural networks in different domains that aim to provide similar predictions (e.g., one or more intentions of surrounding vehicles) can be assumed to have at least some, potentially high-level, similarities. For example, a model associated with one domain (e.g., trained from data collected within that domain) may be assumed to have at least one parameter that is transferrable to a model of the target domain. The term "transferrable," is intended to refer to parameters that, if transferred, would reduce the overall training time necessary (in comparison to training the target network from scratch) to provide output with over a threshold degree of accuracy. Naively copying all of the parameters from one domain to another is problematic. Pretraining with some parameters of the source domain could even lead to worse performance than training the target network from scratch. Embodiments are directed to addressing these and other problems, individually and collectively.

By way of example, an automatic parameter selector (e.g., a computing agent referred to herein as the "selector agent") is disclosed that utilizes reinforcement learning (e.g., one or more reinforcement learning algorithms) to select which parameters of a source model (e.g., a neural network trained from data associated with a source domain), when transferred, are most beneficial with respect to transferred learning. The term "computing agent" is intended to refer to a software program, logic, or code that, when executed, is configured to perform a task autonomously. By way of example, a computing agent can include instructions that, when executed, identify which set of parameters, if transferred from a source model, would significantly reduce the necessary training time, while achieving a threshold degree of accuracy, of a target model (e.g., a target neural network associated with a target domain). Moreover, given a relatively small amount of target domain data, the parameters of the target model may be trained and/or finetuned such that training the target model is more efficient than doing so from scratch.

A set of candidate target neural networks (also called "student neural networks") can be initialized (e.g., preloaded) with varying subsets of parameters of a source network (also called a "teacher network"). The selector agent (e.g., a computing agent corresponding to a software program, logic, code, etc.), when executed, may be configured to utilize a predefined decision process and reinforcement learning to learn a policy for selecting an optimal combination of transfer parameters (e.g., which student neural network includes the optimal combination of transfer parameters). The disclosed techniques accelerate the transfer procedure compared to trying out various combinations of parameters to transfer by hand. Although examples are provided with respect to neural networks used for autonomous driving, the same techniques can be similarly applied to other contexts. The use of autonomous driving is used for illustrative purposes and is not intended to limit the scope of this disclosure. The methods disclosed herein are invariant with respect to the type of model. Thus, the same techniques may be applied to other predictive models such as recurrent neural networks, convolutional neural networks, temporal convolutional neural networks, and the like. Additionally, the disclosed techniques do not require acquiring data from the source domain. Even if only small amounts of data are available in the target domain, the disclosed techniques may be utilized to reduce the time and/or data needed to train the target network to produce acceptable output (e.g., output that meets a threshold accuracy condition).

Prior to discussing embodiments, some terms can be described in further detail.

As used herein, "reinforcement learning techniques" or "reinforcement learning algorithms," are intended to techniques that include a computing agent that takes actions in an environment and utilizes rewards to learn a policy. The computing agent may be configured to learn how to achieve a goal (e.g., maximizing a total reward) through rewarding beneficial activity and/or punishing non-beneficial activity The computing agent may utilize exploration and/or exploitation tactics to learn new information or exploit previously learned information. Some example reinforcement learning algorithms include SARSA, Deep Q Network (DQN), TD(0), and the like.

As used herein, a "parameter" is intended to refer to a value (e.g., a weight, a coefficient, etc.) that a machine learning algorithm (e.g., a neural network) can optimize as it learns. A parameter can be a configurable variable that is internal to the model whose value can be estimated or learned from training data provided over time as input. For example, a parameter may correspond to a value (e.g., weight) of a connection between neurons of a neural network.

A "computing device" may include one or more processors and a memory. A "processor" may include any suitable data computation device or devices. A processor may comprise one or more microprocessors working together to accomplish a desired function. A "memory" may be any suitable device or devices that can store electronic data. A suitable memory may comprise a non-transitory computer readable medium that stores instructions that can be executed by at least one processor to implement a desired method. Examples of memories may comprise one or more memory chips, disk drives, etc. Such memories may operate using any suitable electrical, optical, and/or magnetic mode of operation.

As used herein, a "vehicle" may include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode.

Details of some embodiments will now be described in greater detail.

FIG. 1 illustrates an example flow 100 depicting the utilization of reinforcement learning for identify an optimal combination of parameters to transfer learning from one domain to another, in accordance with at least one embodiment.

At 102, a source neural network (e.g., SNN 104, also referred to herein as a "teacher network") that has been previously trained with source domain data (e.g., source domain data 106) may be obtained. Source domain data 106 is intended to depict data obtained from and/or associated with a source domain (e.g., Country A, etc.). SNN 104, as depicted in FIG. 1, and/or any neural network discussed herein includes any suitable combination of an input layer with units representing input fields, one or more hidden layers, an output layer with one or more units representing output fields, where units (e.g., "neurons" such as neuron 108) of the neural network are interconnected with varying connection weights. SNN 104 may represent a temporal convolutional neural network, as a non-limiting example.

At 110, a variety (e.g., two or more) candidate target neural networks (e.g., candidate target neural networks (NNs) 112-116, also referred to herein as "student neural networks") may be initialized with respective subsets of the parameters of the SNN 104. By way of example, candidate target NN 112 may be initialized with one subset of the parameters the SNN 104 (e.g., parameters corresponding to a first set of layers, one layer, etc.). Candidate target NN 114 may be initialized with a second subset of the parameters of SNN 104 (e.g., parameters corresponding to a second set of layers, two layers, etc.). Candidate target NN 116 may be initialized with a third subset of the parameters of SNN 104 (e.g., parameters corresponding to a third set of layers, three layers, etc.). It should be appreciated that any suitable portion of the parameters of SNN 104 may be used with any suitable number of candidate target neural networks. The granularity of the portions of parameters utilized may vary. For example, in some embodiments, whole layers may correspond to a unit or subset of parameters transferred and each candidate target NN may be initialized with a different combination of the layers of the SNN 104. In other embodiments, the granularity of the unit or subset of parameters transferred from the SNN 104 may correspond to multiple layers, single or multiple neurons (e.g., neuron 108 and/or parameters, or any suitable combination thereof. In some embodiments, the candidate target neural networks may include various sequences of parameters. For example, candidate target NN 112 may include layer 1 of SNN 104, candidate target NN 114 may include layers 1 and 2 of SNN 104, candidate target NN 116 may include layers 1-3 of SNN 104, and so on. The candidate target NNs collectively may, in some cases, include every permutation of a given parameter granularity (e.g., every permutation of neurons obtained from the SNN 104, every permutation of the layers obtained from the SNN 104, every permutation of two sequential layers, etc.).

At 116, the candidate neural networks may be trained using reinforcement learning techniques. Generally, the reinforcement learning techniques may include executing a reinforcement learning algorithm in which a computing agent (depicted as agent 118) takes actions in an environment 120 and getting feedback from the environment 120 based on taking the action, and takes in a reward function (e.g., a decision process) defining beneficial activity and non-beneficial activity to determine rewards for the actions taken. The computing agent may be configured to learn how to achieve a goal (e.g., maximizing a total reward) through rewarding beneficial activity and/or punishing non-beneficial activity. The computing agent may utilize exploration and/or exploitation tactics to learn new information or exploit previously learned information. Some example reinforcement learning algorithms include SARSA, Deep Q Network (DQN), TD(0), and the like.

The decision process defining how candidates are to be selected may be modeled as a Markov Decision Process (MDP) or the like. An MDP may refer to a discrete-time decision making mathematical framework where the agent (e.g., agent 118) behaves by taking an action each time (e.g., selecting a neural network to train) and getting feedback from the environment 120 based on taking the action. A MDP may include a tuple (S, A, R, T, γ), where S is a set of states, A is a set of actions, R:S$\mapsto \mathbb{R}$ is the reward function, T(s, a, s')=p(s'|s, a) is the transition function where p is the probability of the s' state being selected given state s and action a, and γ∈[0,1] is the discount factor. The selector agent may be configured to take an action (e.g., to decide what neural network to train next), to enter the state corresponding to the action (e.g., where the selected student is trained), to score or otherwise identify meaningful statistics for performing the action, and to update the current expected cumulative reward that state can achieve.

By way of example, a candidate target NN (e.g., candidate target NN 112) selected for training may have been previously initialized with a unique set of parameters of the SNN 104. The selected candidate target NN may be provided some portion of training data available from the target domain (e.g., target domain data 124) with which the parameters of the candidate target NN may be trained and/or finetuned. Once trained on this set of data, the candidate target NN may be tested with additional test data to determine a reward for selecting that student neural network next. In some embodiments, the reward may be calculated based at least in part on an accuracy identified for the newly trained candidate target NN. This process can be repeated any suitable number of times. These operations are discussed in more detail with respect to FIGS. 2-5.

At 126, the candidate target NNs may be evaluated (e.g., scored). In some embodiments, the score may be based on identifying an accuracy of the output provided by each of the candidate target NNs by providing test data to each of the candidate target NNs as input and evaluating the accuracy of the corresponding output. Any suitable number of instances of test data may be utilized.

At 128, a highest performing candidate target NN may be selected (e.g., a candidate target NN with the highest score). By way of example, the highest performing candidate target NN may be the one that is determined to produce output with the highest accuracy.

At 130, one or more operations may be performed based at least in part on the selected candidate target NN. As a non-limiting example, the candidate target NNs may individually be neural networks that provide object detection and/or intention identification with respect to autonomous driving contexts. By way of example, each candidate target NN may be configured and trained to identify or generate a label or trajectory that represents the intention of a surrounding vehicle from images/sensor data and object data corresponding to objects identified from the images/sensor data as input. In some cases, the input data for these candidate target NNs may be times series data including a number (e.g., 1, 2, 4, 8, etc.) of video frames from which features are obtained and used to identify the intention (e.g., lane change, breaking, etc.) of a nearby vehicle. As another example, the candidate target NNs (and SNN 104) may be individual neural networks each configured to identify an object from one or more images and/or instances of other sensor data collected within (e.g., by a vehicle such as vehicle 800 of FIG. 8) and associated with a respective domain.

Further details regarding the operations performed by computing agent (e.g., agent 118) of FIG. 1 are now disclosed.

Figure 2:
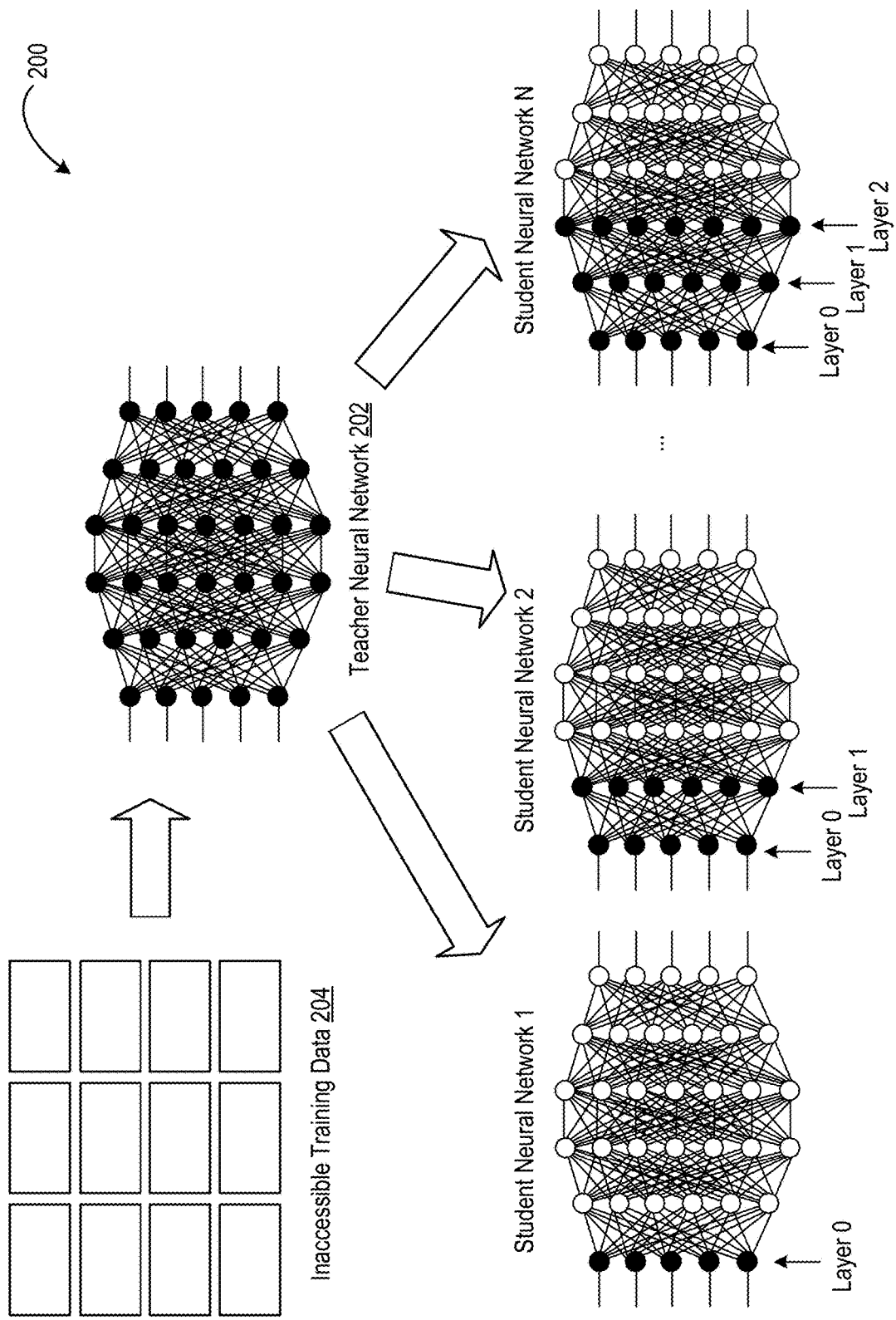
FIG. 2 illustrates an example method for initializing any suitable number of candidate machine learning models, in accordance with at least one embodiment.

FIG. 2 illustrates an example method 200 for initializing any suitable number of candidate machine learning models, in accordance with at least one embodiment. Teacher neural network (NN) 202 is intended to be an example of the SNN 104 of FIG. 1. Teacher NN 202 may be a previously trained deep neural network (e.g., a convolution neural network (CNN), a recurrent neural network (RNN), a long short term memory (LSTM) networks, and the like) with inaccessible training data 204 (an example of the source domain data 106 of FIG. 1). Inaccessible training data 204 may include any suitable data associated with a given domain (e.g., a source domain corresponding to the SNN 104 of FIG. 1). Each instance of inaccessible training data 204 may include any suitable combination of images and/or other sensor data (e.g., images and/or sensor data captured by sensor(s) corresponding to that domain). As a non-limiting example, the images and/or sensor data may be captured from sensors of a vehicle operating within the given domain. However, for various reasons, such as being restricted by law or otherwise, the instances of inaccessible training data 204 may be restricted such that is not available for use in other domains (e.g., a target domain associated with student neural networks 1-N). Student neural networks 1-N may be any suitable neural network similar to SNN 104 (e.g., a same type of neural network) such that the student neural networks 1-N each have a same or substantially similar network structure (e.g., similar neurons, similar input/output layers, a similar number of total layers or layers of a particular type, etc.) as the teacher NN 202. In some embodiments, the student NNs take the same type of input data (e.g., images, sensor data, etc.) as the teacher NN 202 and may be configured to provide the same type or substantially similar type of output as teacher NN 202 (e.g., one or more objects detected from the images/sensor data, one or more driving intentions/expected maneuvers of nearby vehicle in an autonomous driving context, etc.).

Teacher NN 202 may include any suitable number of neurons and layers of neurons. Although not depicted, in some embodiments, Teacher NN 202 is prediction model (e.g., a temporal convolutional neural network TCN). A TCN forms a hierarchical structure that encode the temporal features into the convolutional neural network, where each internal node of the tree-like structure is a residual block composed of multiple layers of dilated convolution, activation, and normalization. The TCN may have any suitable depth (e.g., 4, 6, etc.) where a depth corresponds to a number of residual blocks.

A computing device may be configured to select various sets of parameters of teacher neural network 202. By way of example, the computing device (e.g., computing device 700 of FIG. 7) may execute operations to identify various combinations and/or permutations of the parameters of teacher neural network 202. It may be the case that input and/or output layers of the teacher neural network 202 may be excluded from consideration with respect to the following operations used to identify various combinations/permutations of parameters to be transferred. In some embodiments, the combinations and/or permutations of the parameters may be subject to a predefined unit of transfer granularity. For example, the computing device may be configured to identify various combinations of layers, neurons, residual blocks, or the like. As depicted in FIG. 2, the unit of transfer granularity (e.g., the smallest unit that may be transferrable) for identifying the combinations and/or permutations of parameters of teacher neural network 202 may be set to a layer. Using this unit of granularity, each student neural network (e.g., student neural networks 1-N may be configured with different individual layers such as layers[0], layers[0, 1], layers[0, 1, 2], layers[0, 1, 2, ..., N]). In some embodiments, a combination/permutation of the parameters of teacher neural network 202 may include units of parameters (e.g., layers) that are non-contiguous. For example, layers[0], layers[0, 1], layers[0, 2], layers[0, 3], layers[0, 4], layers[0, 2], layers[0, 2, 3], and so on. As another non-limiting example, when using a neuron as the unit of transfer granularity, neurons of a same or different layer may be combined. The various parameter combinations/permutations identified may be transferred to a corresponding student neural network. Transferring a parameter from the teacher neural network 202 refers to assigning a parameter of a given student neural network to the same value as the corresponding parameter of the teacher neural network 202.

In some embodiments, the parameters, once transferred, the parameters of the student neural networks 1-N may be frozen (e.g., made immutable) or the transferred parameters may be pretrained but finetuned through additional training within the target domain associated with the student NN.

Figure 3:
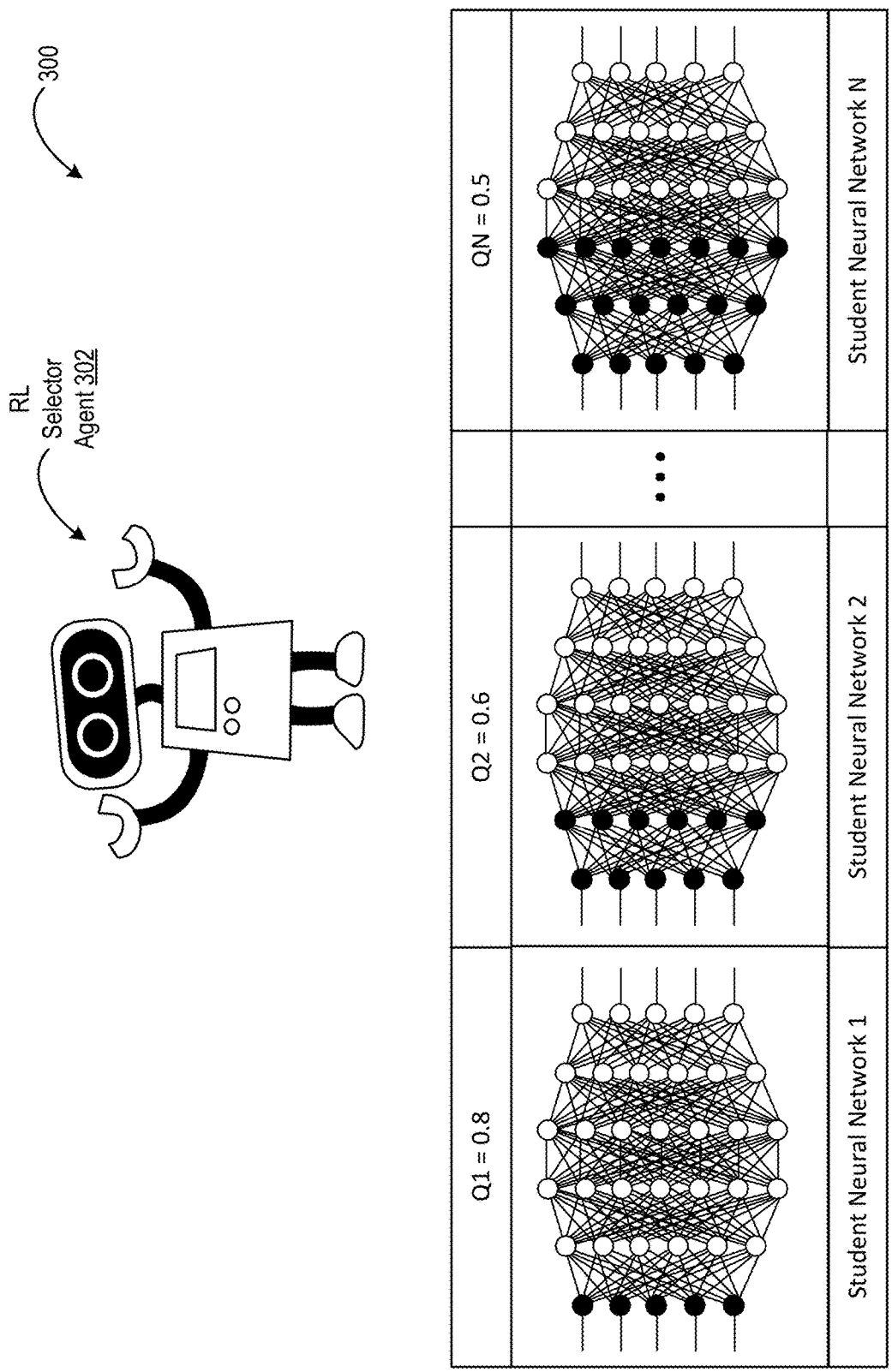
FIG. 3 illustrates an example method for selecting one candidate machine learning model from a set of candidate machine-learning models, in accordance with at least one embodiment.

FIG. 3 illustrates an example method 300 for selecting one candidate machine learning model (e.g., student neural network x) from a set of candidate machine-learning models (e.g., student neural networks 1-N of FIG. 2), in accordance with at least one embodiment. As described above, a Markov Decision Process may be defined to model the selection process as a reinforcement learning (RL) mission. A MDP may include a tuple (S, A, R, T, γ), where S is a set of states, A is a set of actions, R:S⟼ℝ is the reward function, T(s, a, s')=p(s'|s, a) is the transition function where p is the probability of the s' state being selected given state s and action a, and γ∈ [0,1] is the discount factor.

A policy, π(s, a)=p(a|s), specifies the probability of performing action a at states. Under a given policy π, the value of a state $V^\pi(s)$ is defined by the expected total discounted reward obtained starting from state s using the following formula:

$$V^\pi(s) = \mathbb{E}\left[\sum_{t=0}^{\infty} \gamma^t \mathcal{R}(s_t) \mid s_0 = s, \pi\right] \quad (1)$$

The Q-function $Q^\pi(s, a)$ is defined by the expected total discounted reward obtained starting from state s and performing action a using the following formula:

$$Q^\pi(s, a) = \sum_{s' \in S} \mathcal{T}(s, a, s')\left[\mathcal{R}(s') + \gamma \max_{a' \in \mathcal{A}} Q^\pi(s', a')\right] \quad (2)$$

In some embodiments, reinforcement learning algorithms find an optimal policy π, which is the policy that maximizes the discounted cumulative reward received for any state. uses an existing estimate to update. For each step of the algorithm, it takes action and observes the reward and next state based on this step, so that the value of the current state is updated with a probability. This can be expressed with the following formula:

$$V(S) \leftarrow V(S) + \alpha[R + \gamma V(S') - V(S')] \quad (3)$$

Using the probabilities assigned to each state, the computing agent can select the action given by the policy or do random exploration.

Some example reinforcement learning algorithms include SARSA, Deep Q Network (DQN), TD(0), and the like.

SARSA considers transitions from state-action pair to state-action pair and learns the values of those as expressed by Q values. Unlike TD(0), which updates V values, SARSA updates Q values using the following formula:

$$Q(S,A) \leftarrow Q(S,A) + \alpha[R + \gamma Q(S',A') - Q(S',A')] \quad (4)$$

Similar to TD(0), the SARSA algorithm selects action based on Q values or performs random exploration.

Deep Q Network (DQN) uses a convolution neural network to approximate Q values. It is known that reinforcement learning is unstable when a neural network (e.g., a nonlinear function approximator) represents the Q function, but DQN addresses this issue by randomizing the data, and providing an iterative update to reduce correlations with the target.

In some embodiments, the following MDP definitions may be predefined and provided to an RL selector agent 302 (an example of computing agent 118 of FIG. 1) which in turn may use the MDP definitions to drive the NN selection process. Example MDP definitions may be as follows, where i is the index of the student network:
1. State S: the current student NN i being trained
2. Action A: {i+1 or i−1}
3. Reward R: $f_i$ score of i given a batch of training data D
4. Transition Function T: Probability(s'|s=i, a=i+1) (e.g., the probability of arriving at state s' from taking action a from state s).
5. Discount Factor γ: 1.0

In some embodiments, the RL selector agent 302 may treat the selection process of one of the student neural networks 1-N (e.g., an example of the student networks 1-3 of FIG. 2) as an RL mission. Each state s∈ S represents the current student being selected to train. A value (V or Q depending on the RL algorithm being utilized) gives the expected cumulative reward the state can achieve. Said another way, the Q value is a measure of the overall expected reward assuming the agent is in state s and performs action a, and then continues playing until the end of the episode following some policy π. The RL selector agent 302 chooses an action a∈A that decides what should be the next state, i.e., the next student to be trained. The $f_1$ score is the score the student NN receives from training a batch of training data. Transition function may be set to deterministic and the decay rate γ may be set to 1.0.

Figure 4:
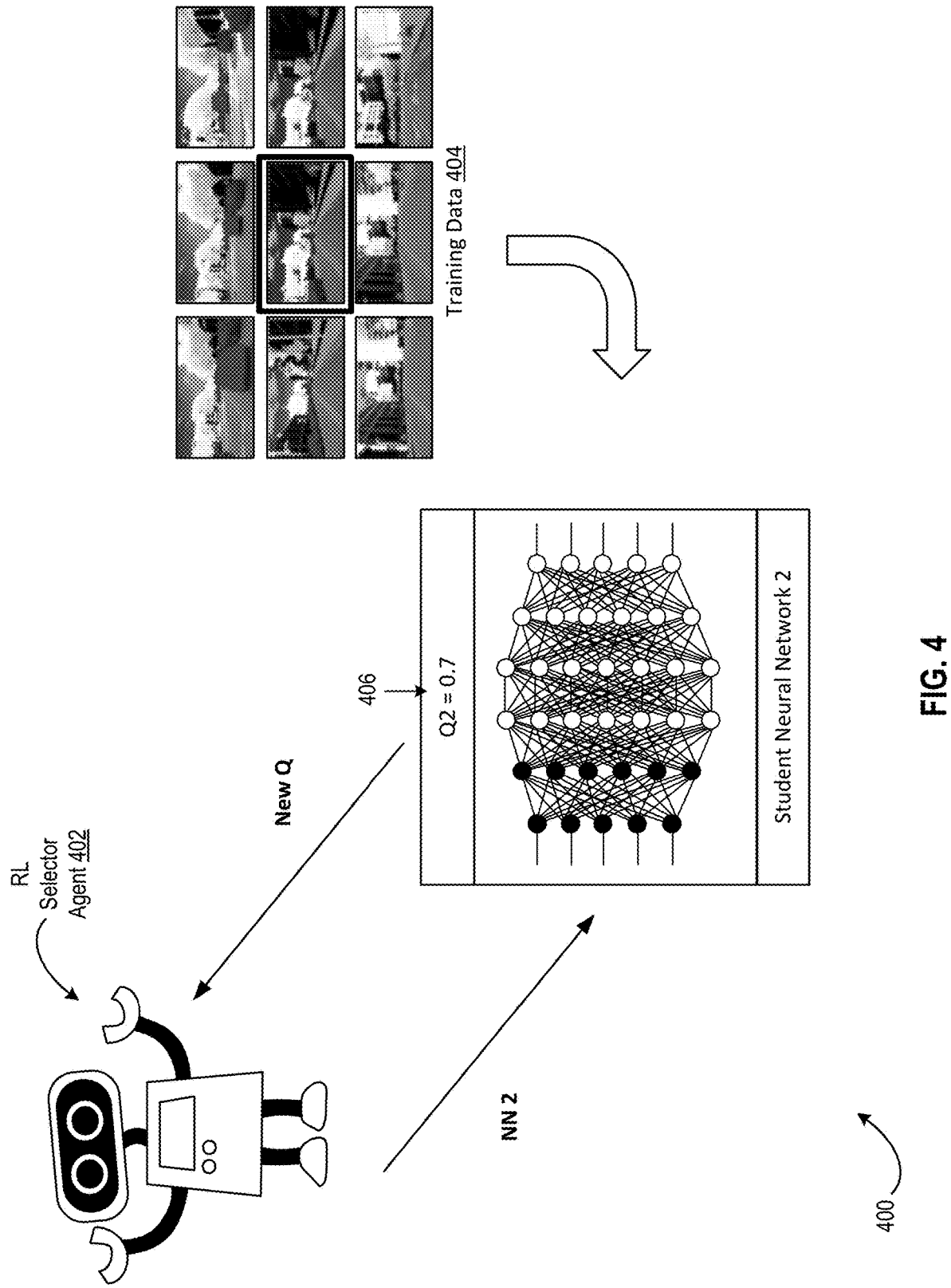
FIG. 4 illustrates an example method for training the selected candidate machine-learning model, in accordance with at least one embodiment.

FIG. 4 illustrates an example method 400 for training the selected candidate machine-learning model, in accordance with at least one embodiment. In the ongoing example, student neural network 2 is selected by RL selector agent 402 (an example of the RL selector agent 302 of FIG. 3). Once selected, the student neural network for training in accordance with the operations discussed above in connection with FIG. 3. In some embodiments, After the selector agent enters the current state (i.e., selects which student NN to train), the selected student NN is updated. For example, as depicted in FIG. 4, student NN 2 is selected and provided a relatively small batch of training data (e.g., a portion of training data 404 of a target domain, where training data 404 is an example of the target domain data 124 of FIG. 1. In some embodiments, training data 404 may include validation data with which the student neural network 2 may be validated. In some embodiments, the parameters of student neural network 2 transferred from the teacher neural network as discussed in FIG. 2, may be frozen (e.g., made immutable, unchangeable, etc.) or these parameters may be pretrained/finetuned. In either case, the rest of the parameter units may be updated based at least in part on executing the corresponding machine-learning algorithm on training data 404.

In some embodiments, the RL selector agent 402 may use validation data (e.g., some examples of training data 404 for which a label and/or output is known) and provide the validation data to the trained student neural network 2 in order to calculate an $f_1$ score (or other meaningful statistics) and updates the value (e.g., the Q value) corresponding to student neural network 2 based at least in part on the $f_1$ score (e.g., a score indicating the accuracy of the student neural network 2 in producing output that matches the output indicated in the validation data). The RL selector agent 402 may repeat the method 300 to find the next student neural network to train.

Figure 5:
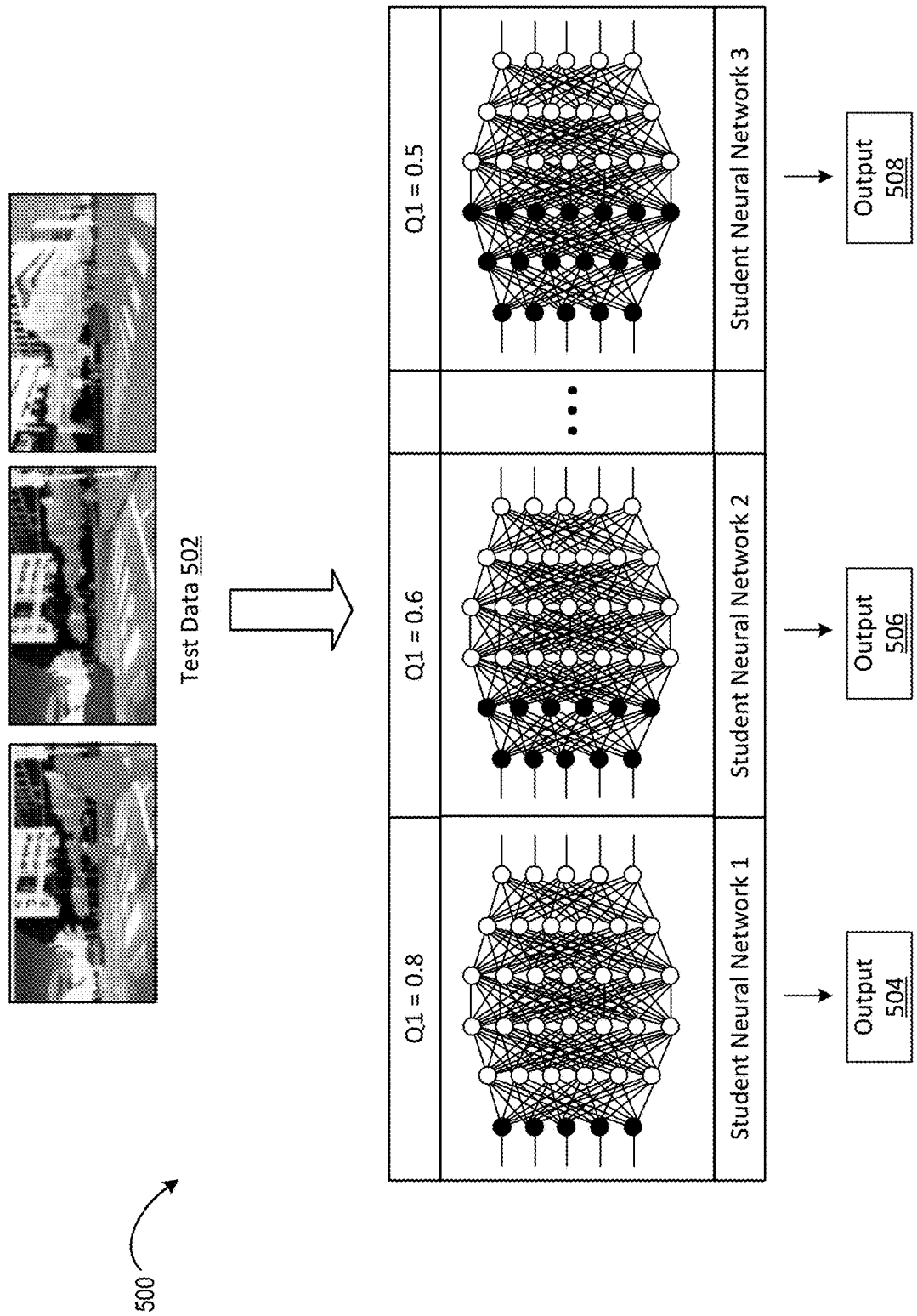
FIG. 5 illustrates an example method for evaluating the selected candidate machine-learning model, in accordance with at least one embodiment.

FIG. 5 illustrates an example method 500 for evaluating a set of trained candidate machine-learning models, in accordance with at least one embodiment. In some embodiments, test data 502 may be a portion (e.g., 20%, 15%, etc.) of data (e.g., target domain data 124) associated with a target domain and/or used to train the corresponding student neural networks 1-N (e.g., each an example of the candidate target NNs of FIG. 1, the student neural networks of FIGS. 2-4, etc.).

In some embodiments, any suitable portion of the training data may be utilized during the training phase to train the student neural networks 1-N based on performing the operations discussed above in connection with FIG. 4. For example, 70% of the training data may be utilized to train the student neural networks 1-N. Once trained, or at any suitable time, the student neural networks 1-N may be evaluated to assess their quality (e.g., their accuracy). By way of example, a test data 502 may be a sub-portion (e.g., 20%, 15%, etc.) of the examples of the training data, or there may be additional examples, that may be utilized as input to student neural networks 1-N to generate outputs 504-508.

Any of the outputs 504-508 may be presented to a user to solicit feedback. If the user identifies the output 504 as being accurate, the output may be marked as such. Any suitable number of examples of the test data 502 may be provided to the user and a number of accurate outputs (as identified by the user) may be compared to the total number of examples provided to the student NN to determine an accuracy value for a given NN that quantifies a degree of accuracy for the NN.

In some embodiments, after the student neural networks 1-N are trained and accuracy determined, a computing device (e.g., the computing device 700 of FIG. 7) may select the student neural network having the highest degree of accuracy (e.g., the student NN having the highest assigned accuracy value).

Figure 6:
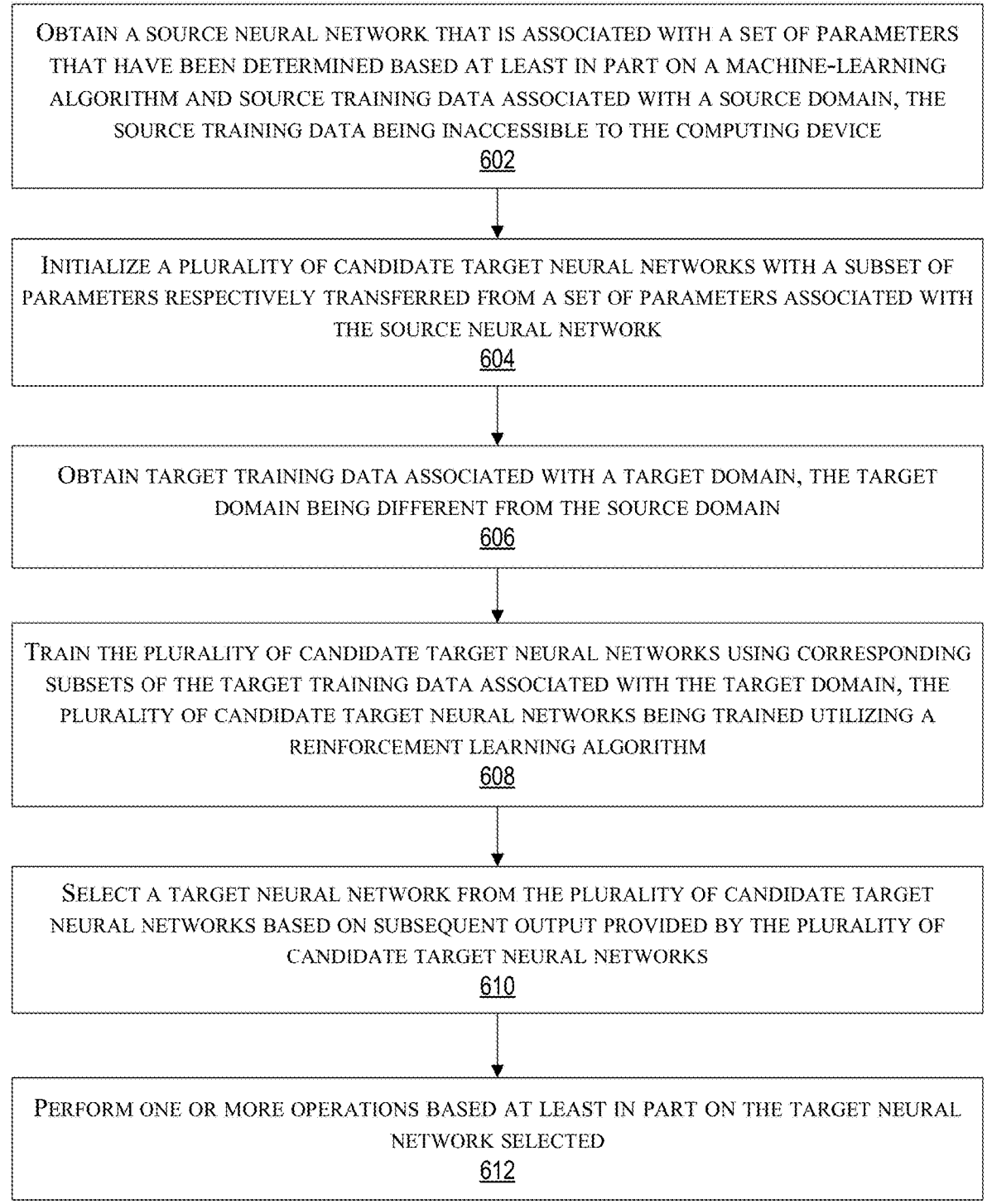
FIG. 6 is a flowchart of an example method, in accordance with at least one embodiment.

FIG. 6 is a flowchart of an example method 600, in accordance with at least one embodiment. In some implementations, one or more process blocks of FIG. 6 may be performed by a computing device (e.g., the computing device illustrated in FIG. 7). Although FIG. 6 shows example blocks of method 600, in some implementations, method 600 may include additional blocks, fewer blocks, different blocks, or differently arranged blocks than those depicted in FIG. 6. Additionally, or alternatively, two or more of the blocks of method 600 may be performed in parallel. In some embodiments, the operations described below in connection with method 600 may be performed by the computing device 700 of FIG. 7.

As shown in FIG. 6, the method 600 may begin at 602, where a source neural network (SNN) (e.g., SNN of FIG. 1) may be obtained. In some embodiments, the SNN that is associated with a set of parameters that have been determined based at least in part on a machine-learning algorithm and source training data associated with a source domain. In some embodiments, the source training data may be inaccessible to the computing device. Source training data may include any suitable data collected by one or more sensor(s) 802 of FIG. 8 from a vehicle (e.g., vehicle 800) or any suitable sensor(s) associated with the source domain. In some embodiments, the target training data may include any suitable combination of images, videos, RADAR data, LIDAR data, sonar data, or the like, collected and/or associated with the source domain.

At 604, a plurality of candidate target neural networks (e.g., the candidate target neural networks of FIG. 1, the student neural networks of FIG. 2, etc.) may be initialized with a subset of parameters respectively transferred from a set of parameters associated with the source neural network. The candidate target neural networks may be initialized in accordance with the operations described in connection with method 200 of FIG. 2.

At 606, target training data (e.g., target domain data 124) associated with a target domain may be obtained. In some embodiments, the target domain (e.g., Region A) being different from the source domain (e.g., Region B). Target training data may include any suitable data collected by one or more sensor(s) 802 of FIG. 8 from a vehicle (e.g., vehicle 800) or any suitable sensor(s) associated with the target domain. In some embodiments, the target training data may include any suitable combination of images, videos, RADAR data, LIDAR data, sonar data, or the like, collected and/or associated with the target domain.

At 608, the plurality of candidate target neural networks may be trained using corresponding subsets of the target training data associated with the target domain. In some embodiments, the plurality of candidate target neural networks being trained utilizing a reinforcement learning algorithm. By way of example, the plurality of candidate target neural networks may be trained by executing the method 200 of FIG. 2 to select a particular candidate target neural network followed by executing the operations of method 300 described above in connection with FIG. 3 to train the selected candidate neural network. The operations for selecting and training the selected neural network may be performed any suitable number of times based at least in part on any suitable predefined rule set describing a set of conditions to be met for the training process to end. By way of example, the rule set can identify a particular number of training executions (total or per neural network), a threshold degree of accuracy (indicating an accuracy that one or more neural networks must reach before training is halted), or the like.

At 610, a target neural network may be selected from the plurality of candidate target neural networks based on subsequent output provided by the plurality of candidate target neural networks. By way of example, the plurality of candidate target neural networks may be evaluated using the method 500 of FIG. 5 to identify a highest performing candidate target neural network.

At 612, one or more operations may be performed using the target neural network selected. As a non-limiting example, the target neural network may be deployed (e.g., by the computing device 700 of FIG. 7) or otherwise installed at the vehicle 800 of FIG. 8 and utilized thereafter to provide output with which actions of the vehicle 800 are determined. For example, the target neural network may be used to identify objects from sensor data subsequently collected by sensor(s) 802 and provided as input to the target neural network. As another example, the target neural network may be one configured to identify driving intentions of nearby vehicle based at least in part on objects identified from sensor data collected by sensor(s) 802 and/or from the sensor data itself.

A more formal representation of the algorithm including the methods 200-500 is provided below.

Automatic Transfer Selector via Reinforcement Learning (ATSRL)

Input: Training Data $D=\{D_1, D_2 \ldots D_m\}$ where m is the number of fold D is split, Teacher NN $N_T$ Initialize $V(s_i)$ or $Q(s_i, a)$, $s_{t0}$, $f_1\_best$, Student NN $N_{Si}$, $i \in \{1, 2 \ldots n\}$ with 1, 2 . . . i parameter units copied from $N_T$ to $N_{Si}$
(optional) lock 1, 2 . . . i parameter units of $N_{Si}$
while $D_t \neq \phi$ do
$D_t \leftarrow D_j \in D$
$f_1 \leftarrow Train(N_{Si}, D_t)$
Update $(Q(s_t), f_1)$
if $f_1 > f_1\_best_{St}$ then
  save $N_{St}$
end if
$a_t \leftarrow max_a Q(s_t, a)$
$s_{t+1} \leftarrow T(s_t, a_t)$
end while The input of the above algorithm is the training data $D=\{D_1, D_2 \ldots D_m\}$ and the teacher network $N_T$. D may be split into small folds so that each finetuning step the state represents uses only a small batch of the data. State $s_i$ represents the current student network $N_{Si}$ being trained, $s_{t0}$ denotes which student is selected at the beginning, (i.e., time $t_0$), and $f_1\_best$ denotes a list of the best $f_1$ scores or other meaningful statistics for each of the student so far. The parameter units are copied from $N_T$ to $N_{Si}$ based at least in part on the initialization process of method 200.

Next, at each time step, a batch may be selected from the training data. The training data may be traversed more than once because, in some embodiments, the student NNs might get the same batch of data each time. The selected student may be trained with this small amount of data and its $f_1$ score may be recorded. The $f_1$ score may be used to update the value of the current state. Moreover, if the score is better than the score of this state that has been observed so far, the model $N_{Si}$ may be saved. An action and the next state is selected according to the current value and the transition function discussed above.

As a non-limiting example, a prediction model may be trained with the data (e.g., training and validation data of source domain data 106 of FIG. 1. This model may be denoted $Model_{DomainA}$. Another prediction model, denoted $Model_{DomainB}$, may be obtained. $Model_{DomainB}$ may be previously trained with data associated with a domain (e.g., Domain B), but that data may be inaccessible to the $Model_{DomainA}$ and/or the computing device training the $Model_{DomainA}$. Parameters of $Model_{DomainB}$ may be used to pretrain $Model_{DomainA}$ such that $Model_{DomainA}$ could surpass a prediction model trained from scratch in Domain A. In some embodiments, a number of statistics (e.g., corresponding to outputs 504-506) may be used to identify the accuracy of the prediction model. In some embodiments, the statistics may include any suitable combination of: a lane change false positive rate (FPR), a lane change prediction, a lane change recall, a 05 frame early rate, a 10 frame early rate, or the like.

Embodiments provide various technical improvements over conventional systems that may require access to both source and target domain data in order to transfer learning from a neural network of a source domain to a neural network of a target domain. The reinforcement learning utilized herein enables the system to identify an optimal combination of parameters from a source neural network that, when transferred to a target neural network, causes the target neural network to produce the most accurate output of any of the possible candidates. This reduces the likelihood that parameters are transferred which will negatively affect the accuracy of the target neural network. Likewise, the provided techniques can increase the likelihood that parameters that will beneficially affect (e.g., increase) the accuracy of the target neural network are transferred. The disclosed techniques drastically reduce the amount of manual input needed and accelerate the transfer procedure compared to trying out various combinations of parameters to transfer by hand. The disclosed techniques are invariant with respect to the type of model. Thus, the same techniques may be applied to any model (e.g., any prediction models such as neural networks, convolutional neural networks, temporal convolutional neural networks, and the like). Unlike traditional transfer learning that require source domain data, the disclosed techniques do not utilize data acquired from the source domain and can be utilized when only target domain data is available. Even if only small amounts of data are available in the target domain, the disclosed techniques may be utilized to reduce the time and/or data needed to train the target network to produce acceptable output (e.g., output that meets a threshold accuracy condition) when compared to the time and data needed to train the target network from scratch.

Figure 7:
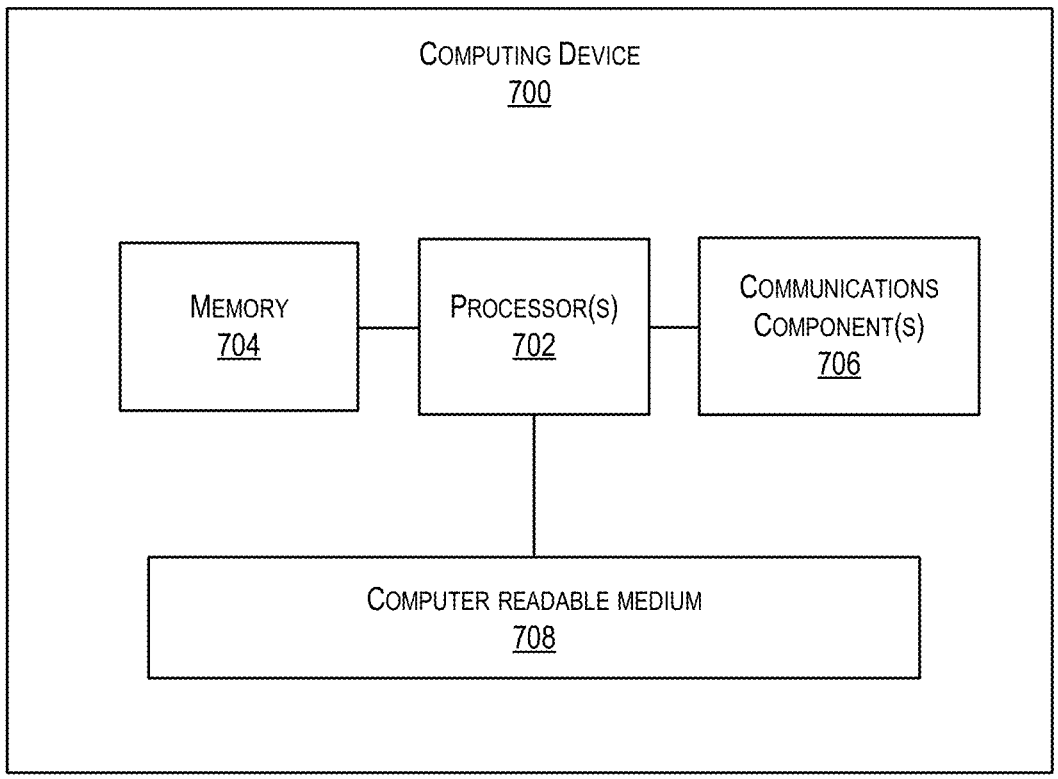
FIG. 7 illustrates components of an exemplary computing device, according to various embodiments.

FIG. 7 illustrates a block diagram of an exemplary computing device 700, according to various embodiments. The computing device 700 configured to receive inputs collected by a plurality of sources including one or more sensors (e.g., sensor(s) 802 of FIG. 8) coupled to a vehicle (e.g., the vehicle 800 of FIG. 8). These inputs may be received from the vehicle 800 or from any suitable computing device, storage, or system not depicted here (e.g., from a data base configured to store such inputs). According to various embodiments, computing device may include processor(s) 702, which may be coupled to a system memory 704, communication component(s) 706, computer readable medium 708, or any suitable combination thereof.

The memory 704 may be in the form of one or more memory devices (e.g., RAM, EEPROM, ROM chips), using any suitable mode of data storage. The memory 704 may store one or more software algorithm(s) (not shown). The software algorithm(s) may include, for example, an artificial intelligence (AI) model(s) or algorithm(s), a machine learning (ML) model(s) or algorithm(s), an analytical model(s) or algorithm(s), a rule-based model(s) or algorithm(s), or a mathematical model(s) or algorithm(s).

The communications component(s) 706 can be any suitable component(s) for communicating (e.g., sending/receiving data) via any suitable communications network(s) (not depicted) to and from the components of a vehicle computer (e.g., the vehicle computer 850 of FIG. 8) or any suitable computing device or system not depicted here. In some instances, the communication component(s) may include one or more of a wired network such as, an Ethernet backbone network, a controller area network (CAN) bus, a local interconnect network (LIN), a media-oriented system transport (MOST), a fiber-optic network, a digital subscription line ("DSL") network, a broadband network, and/or a flexray network. In other instances, the communication component(s) may also include a wireless network such as, for example, a Wi-Fi or wireless local area network ("WLAN"), a wireless wide area network ("WWAN"), and/or a cellular network.

A computer readable medium 708 may also be operatively coupled to the processor(s) 702 of the computing device. The computer readable medium 708 may comprise code that, when executed by the processor(s) 702, cause the computing device 700 to perform any suitable combination of the operations discussed in connection with FIGS. 1-6. By way of example, executing the code stored in computer readable medium 708 may cause the computing device to perform the operations of method 600 of FIG. 6.

Figure 8:
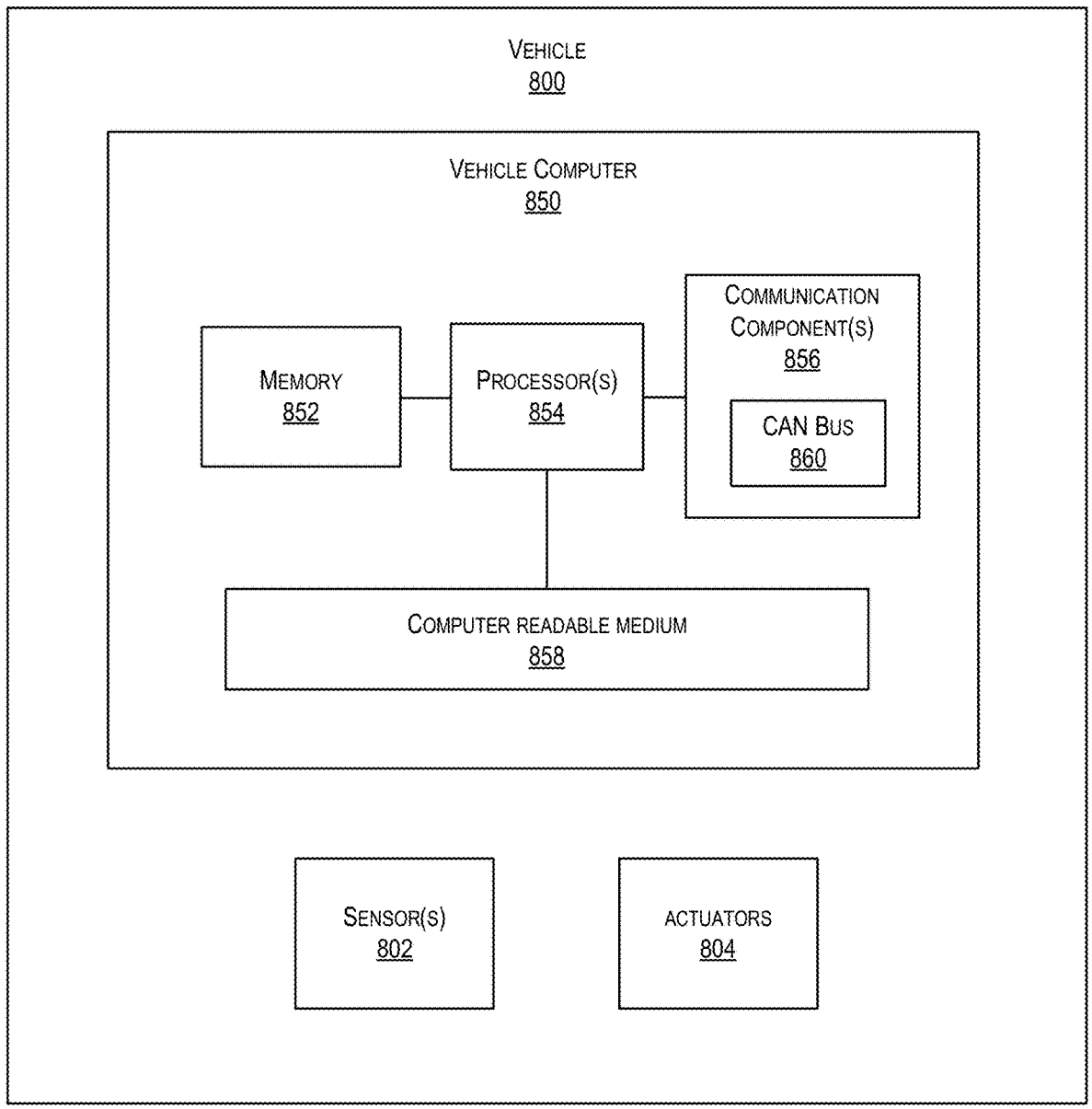
FIG. 8 illustrates components of an exemplary vehicle computer for an autonomous vehicle, according to various embodiments.

FIG. 8 illustrates a block diagram of an exemplary vehicle (e.g., vehicle 800), according to various embodiments. The vehicle 800 may include a vehicle computer 850 that is configured to receive inputs from a plurality of sources including one or more sensors 802 coupled to the vehicle. The vehicle computer 850 is configured to generate outputs (e.g., control signals) for the one or more actuators 804 that control the vehicle 800. For example, the control signals, when executed by the actuators 804, may result in the vehicle 800 initiating a lane change maneuver. The actuators 804 may control a steering, speed or throttle of the vehicle.

According to various embodiments, the vehicle computer 850 may comprise processor(s) 854, which may be coupled to a system memory 852 and a communications component(s) 856.

The memory 852 may be in the form of one or more memory devices (e.g., RAM, EEPROM, ROM chips), using any suitable mode of data storage. The memory 852 may store one or more software algorithm(s) (not shown). The software algorithm(s) may include, for example, an artificial intelligence (AI) model(s) or algorithm(s), a machine learning (ML) model(s) or algorithm(s), an analytical model(s) or algorithm(s), a rule-based model(s) or algorithm(s), or a mathematical model(s) or algorithm(s). In some embodiments, the memory 852 may store one or more models trained by the computing device 700 of FIG. 7 in accordance with the operations discussed above in connection with FIGS. 1-6.

The communications component(s) 856 can be any suitable component(s) for communicating (e.g., sending/receiving data) via any suitable communications network(s) (not depicted) to and from the components of a vehicle computer 850. In some instances, the communication component(s) 856 may include one or more of a wired network such as, an Ethernet backbone network, a controller area network (CAN) bus, a local interconnect network (LIN), a media-oriented system transport (MOST), a fiber-optic network, a digital subscription line ("DSL") network, a broadband network, and/or a flexray network. In other instances, the communication component(s) may also include a wireless network such as, for example, a Wi-Fi or wireless local area network ("WLAN"), a wireless wide area network ("WWAN"), and/or a cellular network.

The sensor(s) 802 may include one or more of a thermal imager camera, an infrared camera, a stereo camera, a time of flight camera, an red/green/blue (RGB) camera, a 2-D camera, a 3-D camera, a 360-degree camera, an imaging radar, a 3-D radar, a 4-D radar, a short-range radar, a medium-range radar, a long-range radar, a pulse-Doppler radar, a frequency-modulated continuous-wave (FMCW) radar, an amplitude modulated lidar, a frequency modulated lidar, a mechanical lidar, a microelectromechanical systems lidar, a flash lidar, an optical phase array lidar, a frequency-modulated continuous-wave (FMCW) lidar, a time of flight scanning lidar, an active sonar, a passive sonar, etc. One of ordinary skill in the art will appreciate that sensor(s) 802 may include other types of sensors and the examples above are not meant to be exhaustive.

A computer readable medium 858 may also be operatively coupled to the processor(s) 854 of the vehicle computer 850. The computer readable medium 858 may comprise code, executable by the processor(s) 854, to perform the operations discussed in connection with FIG. 9.

Although vehicle 800 is described and illustrated as one particular configuration of vehicle, embodiments of the disclosure are suitable for use with a multiplicity of vehicles. In some instances, embodiments of the disclosure are particularly well suited for use with long haul or short haul vehicles, including but not limited to trucks, that carry a variety of cargo.

In some embodiments, the computing device 700 of FIG. 7 may operate, at least in part, at the vehicle 800. In some embodiments, vehicle 800 may be an example of the computing device 700 and may be configured to perform the operations described in connection with computing device 700.

Figure 9:
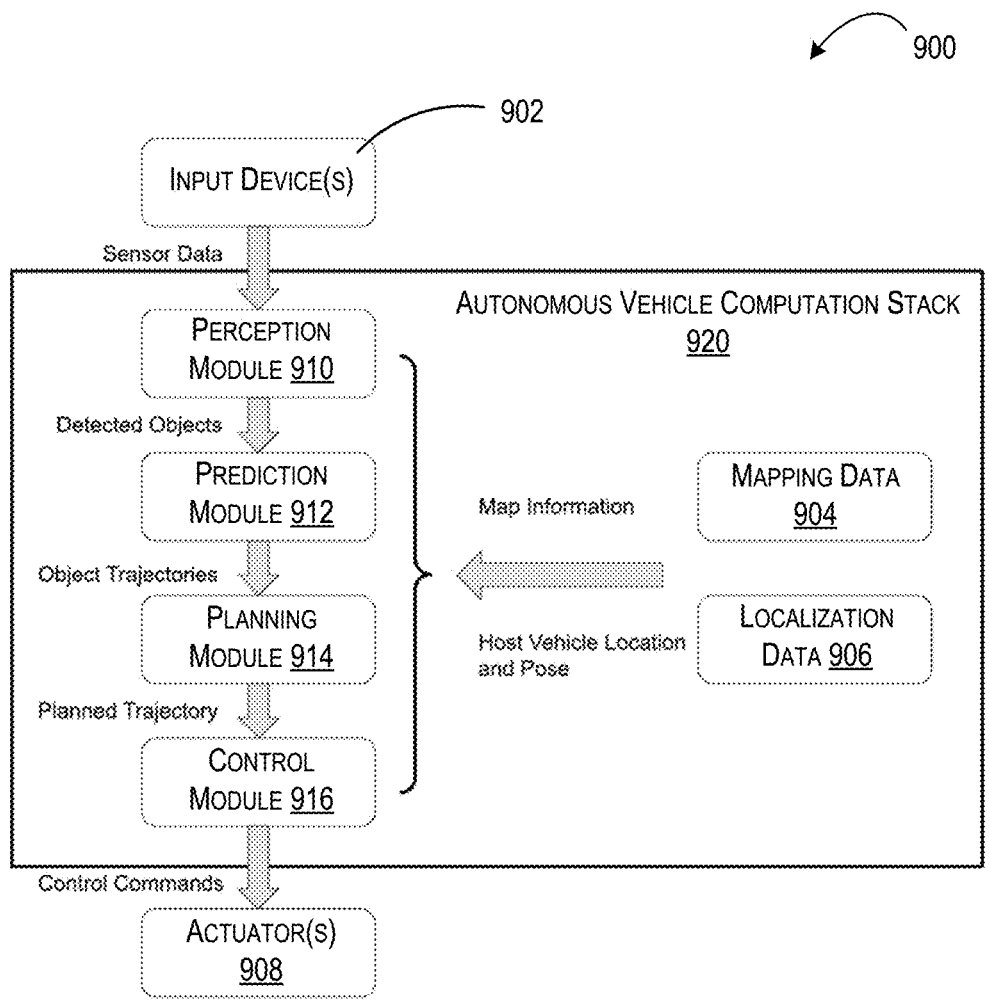
FIG. 9 illustrates a block diagram of an autonomous vehicle computation stack of an exemplary vehicle, according to various embodiments.

FIG. 9 provides another block diagram of an exemplary vehicle computer (e.g., vehicle computer 900), according to various embodiments. The vehicle computer 900 may be an example of the vehicle computer 850 of FIG. 8. Vehicle computer 900 may include a main computation stack 920 (e.g., a vehicle computer) including one or more processors (e.g., processor(s) 854 of FIG. 8). The main computation stack 920 may comprise one or more modules, including but not limited to, a perception module 910, a prediction module 912, a planning/planner module 914, and a control module 916. The instructions corresponding to these modules may be stored in memory (e.g., system memory 852 of FIG. 8).

The main computation stack 920 may receive inputs (e.g., sensor data) from one or more input device(s) 902 (each an example of the sensor(s) 802 of FIG. 8). According to various embodiments, the input device(s) 902 may include one or more of a radar sensor, a light detection and ranging (lidar) sensor, a camera, computer vision, a Global Positioning System (GPS) sensor, etc. The sensor data may be provided to the perception module 910 that may identify one or more objects in the input data. The input data and the identified objects may then be provided to the prediction module 912 that may predict trajectories of the identified objects, so that the planner module 914 may determine one or more trajectories for the vehicle that would avoid the stationary or moving objects based on the input data from the prediction module 912. The one or more trajectories planned by the panning module 914 may be provided to the control module 916, which would then control one or more actuators 908 of the vehicle to have the vehicle advance in accordance with at least one of the one or more trajectories.

The perception module 910, prediction module 912, planning module 914, or any suitable combination thereof, may be configured to utilize one or more machine learning models (e.g., neural networks, etc.) trained in the manner described above in connection with FIGS. 1-6. By way of example, the prediction module 912 may identify objects from input data utilizing an object detection model (e.g., a convolutional neural network, a temporal neural network, etc.) trained to identify objects from one or more images and/or other sensor data (or sequences of images and/or sensor data) using supervised machine learning algorithms and a training data set. If supervised machine learning algorithms are utilized, the training data set may be labeled with classifications or other labels corresponding to objects previously identified in a training data input instance (e.g., within an image and/or from other sensor data). Using this labeled data, the model may be trained to map known inputs to outputs to configure the model to identify objects from subsequent sensor data (e.g., image(s), LIDAR input(s), etc.) provided as subsequent input. In some embodiments, the models utilized by modules 910-914 are associated with a domain (e.g., the United States) and at least some portion of the models may include at least some parameters that have been transferred from a model (e.g., a teacher model such as source neural network 104 of FIG. 1) trained from training data associated with and/or collected from a different domain (e.g., sensor data collected from vehicle in China). The parameters transferred from the previously trained model (e.g., SNN 104) may be frozen (made immutable) or the parameters transferred may be finetuned using training data of the source domain as described above in connection with FIGS. 1-6.

According to various embodiments, any suitable combination of the perception module 910, the prediction module 912, the planning module 914 and/or the control module 916 may also receive mapping data 904 and/or localization data 906 for improved trajectory generation. The modules may calculate their respective outputs based on the mapping data 904 and/or localization data 906, in addition to the inputs received from the input device(s) 902.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

With reference to the appended figures, components that can include memory (e.g., memory 704 of FIG. 7, memory 852 of FIG. 8, etc.) can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally, or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer, controller, or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

What is claimed is:

1. A method comprising:
   obtaining, by a computing device, a source neural network that is associated with a set of parameters that have been determined based at least in part on a machine-learning algorithm and source training data associated with a source domain, the source training data being inaccessible to the computing device;
   initializing, by the computing device, a plurality of candidate target neural networks with a subset of parameters respectively transferred from the set of parameters associated with the source neural network;
   obtaining, by the computing device, target training data associated with a target domain, the target domain being different from the source domain;
   generating, by the computing device, a plurality of trained candidate target neural networks based at least in part on training each of the plurality of candidate target neural networks utilizing a reinforcement learning algorithm, wherein training a candidate target neural network comprises:
      selecting the candidate target neural network according to the reinforcement learning algorithm; and
      finetuning one or more parameters of the candidate target neural network based on providing the candidate target neural network with a subset of the target training data as input, wherein the one or more parameters that are finetuned correspond to the subset of parameters with which the candidate target neural network was initialized;
   selecting, by the computing device, a trained candidate target neural network from the plurality of trained candidate target neural networks based on subsequent output provided by the plurality of trained candidate target neural networks; and
   performing, by the computing device, one or more operations based at least in part on the trained candidate target neural network selected.

2. The method of claim 1, wherein training the candidate target neural network further comprises:
   updating an expected cumulative reward associated with the candidate target neural network based on output provided by the candidate target neural network in response to receiving the subset of the target training data provided as input.

3. The method of claim 1, wherein training the candidate target neural network further comprises freezing a specific set of parameters of the candidate target neural network that were initialized based on corresponding parameters of the source neural network.

4. The method of claim 3, wherein freezing the set of parameters causes the set of parameters to remain unchanged after training.

5. The method of claim 1, wherein the subset of parameters correspond to at least one of: 1) one or more neurons or 2) one or more network layers.

6. The method of claim 1, wherein the reinforcement learning algorithm solves a Markov Decision Process.

7. The method of claim 1, wherein the source neural network is a self-driving prediction model trained to detect objects and/or predict trajectories for detected objects, and wherein the source training data associated with the source domain comprises a plurality of sensor data and corresponding images captured from a vehicle.

8. The method of claim 1, wherein the plurality of candidate target neural networks are each a respective self-driving prediction model trained to detect respective objects and/or predict trajectories for the respective objects detected, wherein the target training data associated with the target domain comprises sensor data and images captured from one or more corresponding vehicles associated with the target domain, and wherein training each of the plurality of candidate target neural networks comprises finetuning the subset of parameters respectively transferred from the set of parameters associated with the source neural network.

9. A computing device, comprising:
one or more processors; and
one or more memories storing instructions that, when executed by the one or more processors, causes the computing device to:
obtain a source neural network that is associated with a set of parameters that have been determined based at least in part on a machine-learning algorithm and source training data associated with a source domain, the source training data being inaccessible to the computing device;
individually initialize a plurality of candidate target neural networks with a subset of parameters respectively transferred from the set of parameters associated with the source neural network;
obtain target training data associated with a target domain, the target domain being different from the source domain;
generate a plurality of trained candidate target neural networks based at least in part on training the plurality of candidate target neural networks utilizing a reinforcement learning algorithm, wherein training a candidate target neural network further causes the computing device to:
select the candidate target neural network according to the reinforcement learning algorithm; and
finetune one or more parameters of the candidate target neural network based on providing the candidate target neural network with a subset of the target training data as input, wherein the one or more parameters that are finetuned correspond to the subset of parameters with which the candidate target neural network was initialized;
select a trained candidate target neural network from the plurality of trained candidate target neural networks based on subsequent output provided by the plurality of trained candidate target neural networks; and
perform one or more operations based at least in part on the trained candidate target neural network selected.

10. The computing device of claim 9, wherein a first subset of parameters of the source neural network utilized for initializing a first candidate target neural network differ from a second subset of parameters of the source neural network utilized for initializing a second candidate target neural network.

11. The computing device of claim 9, wherein respective subsets of parameters corresponding to the plurality of candidate target neural networks are finetuned using a respective portion of the target training data.

12. The computing device of claim 9, wherein the source domain corresponds to a first geographical region and the target domain corresponds to a second geographical region that is different from the first geographical region.

13. The computing device of claim 9, wherein the target training data individually comprises a plurality of images and corresponding sensor data.

14. The computing device of claim 13, wherein the plurality of images and the corresponding sensor data have been captured from one or more devices of an autonomous vehicle.

15. A non-transitory computer-readable medium storing instructions that, when executed by one or more processors of a computing device, cause the computing device to:
obtain a source neural network that is associated with a set of parameters that have been determined based at least in part on a machine-learning algorithm and source training data associated with a source domain, the source training data being inaccessible to the computing device;
initialize a plurality of candidate target neural networks with a subset of parameters respectively transferred from the set of parameters associated with the source neural network;
obtain target training data associated with a target domain, the target domain being different from the source domain;
generate a plurality of trained candidate target neural networks based at least in part on training the plurality of candidate target neural networks utilizing a reinforcement learning algorithm, wherein training a candidate target neural network further causes the computing device to:
select the candidate target neural network according to the reinforcement learning algorithm; and
finetune one or more parameters of the candidate target neural network based on providing the candidate target neural network with a subset of the target training data as input, wherein the one or more parameters that are finetuned correspond to the subset of parameters with which the candidate target neural network was initialized;
select a trained candidate target neural network from the plurality of trained candidate target neural networks based on subsequent output provided by the plurality of trained candidate target neural networks; and
perform one or more operations based at least in part on the trained candidate target neural network selected.

16. The non-transitory computer-readable medium of claim 15, wherein training the candidate target neural network further causes the computing device to compute an estimated value for training the candidate target neural network selected, the estimated value being computed based at least in part on providing testing input data to the candidate target neural network and evaluating a corresponding output of the candidate target neural network.

17. The non-transitory computer-readable medium of claim 16, wherein the corresponding output of the candidate target neural network comprises one or more metrics corresponding to an autonomous driving situation.

18. The non-transitory computer-readable medium of claim 17, wherein the autonomous driving situation corresponds to a lane change.

19. The non-transitory computer-readable medium of claim 15, wherein at least one subset of parameters selected from the set of parameters associated with the source neural network corresponds to a residual block of the source neural network.

\* \* \* \* \*